(12) United States Patent
Kim et al.

(10) Patent No.: US 8,467,780 B2
(45) Date of Patent: *Jun. 18, 2013

(54) SYSTEM AND METHOD FOR PROVISIONING SERVICE FLOWS IN BROADBAND WIRELESS ACCESS COMMUNICATION

(75) Inventors: Jin-A Kim, Seoul (KR); Yun-Sang Park, Gyeonggi-do (KR); Jeong-Hoon Park, Gyeonggi-do (KR); Kang-Gyu Lee, Gyeonggi-do (KR); Yun-Sung Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 559 days.

This patent is subject to a terminal disclaimer.

(21) Appl. No.: 12/397,784

(22) Filed: Mar. 4, 2009

(65) Prior Publication Data

US 2009/0170494 A1 Jul. 2, 2009

Related U.S. Application Data

(63) Continuation of application No. 11/265,970, filed on Nov. 3, 2005, now Pat. No. 7,522,570.

(30) Foreign Application Priority Data

Nov. 3, 2004 (KR) .................................. 89065/2004

(51) Int. Cl.
*H04W 4/00* (2009.01)
(52) U.S. Cl.
USPC ..................................................... 455/422.1

(58) Field of Classification Search
USPC ....... 370/328, 338, 342, 343, 345; 455/414.1, 455/422.1
See application file for complete search history.

(56) References Cited

U.S. PATENT DOCUMENTS

| 6,731,934 B1 | 5/2004 | Mills et al. | |
| 6,986,157 B1 * | 1/2006 | Fijolek et al. | ................. 725/111 |

(Continued)

FOREIGN PATENT DOCUMENTS

RU 2 217 870 11/2003

OTHER PUBLICATIONS

"Signaling for provisioned service flow completion", IEEE 802.16 Broadband Wireless Access Working Group, IEEE C802.16e-04/446, Nov. 3, 2004.

(Continued)

*Primary Examiner* — Nathan Mitchell
(74) *Attorney, Agent, or Firm* — The Farrell Law Firm, P.C.

(57) ABSTRACT

Disclosed is a system and a method for provisioning service flows in broadband wireless access communication. In a broadband wireless access communication system, if a base station receives a registration request message from a mobile station, and if the base station inserts information about service flows to be provisioned by a base station into a registration response message and transmits the registration response message to the mobile station after the registration request message is received, the mobile station determines if the mobile station transits into a normal operation mode corresponding to the information and exactly recognizes a time point at which the mobile station goes into the normal operation mode.

25 Claims, 4 Drawing Sheets

U.S. PATENT DOCUMENTS

| | | |
|---|---|---|
| 2002/0029268 A1 | 3/2002 | Baca et al. |
| 2002/0065907 A1 | 5/2002 | Cloonan et al. |
| 2002/0120749 A1 | 8/2002 | Widegren et al. |
| 2002/0144284 A1 | 10/2002 | Burroughs et al. |
| 2004/0019630 A1* | 1/2004 | Burbeck et al. ............... 709/203 |
| 2004/0109423 A1 | 6/2004 | Sayeedi et al. |
| 2004/0125748 A1 | 7/2004 | Hurtta et al. |
| 2004/0127237 A1* | 7/2004 | Hurtta ........................... 455/466 |
| 2004/0203780 A1 | 10/2004 | Julka et al. |
| 2005/0018651 A1 | 1/2005 | Yan et al. |
| 2005/0165899 A1 | 7/2005 | Mazzola |
| 2005/0250498 A1* | 11/2005 | Lim et al. ...................... 455/436 |
| 2006/0039313 A1 | 2/2006 | Chou et al. |
| 2006/0056279 A1 | 3/2006 | Pronk et al. |
| 2007/0280291 A1 | 12/2007 | Beser |

OTHER PUBLICATIONS

"Signaling for provisioned service flow completion", IEEE 802.16 Broadband Wireless Access Working Group, IEEE C802.16e-04/446r2, Nov. 18, 2004.
Part 16: Air Interface for Fixed and Mobile Broadband Wireless Access Systems, Jun. 1, 2004.
IEEE Standard 802.16-2004. Approved Jun. 24, 2004, pp. 42-44, 51-53 and 62-69.
DOCSIS Radio Frequency Interface Specification. SP-RFIv1.1 I09-020830. Published Aug. 30, 2002.
Kim et al. "Signaling for Provisioned Service Flow Completion", IEEE 802.16 Broadband Wireless Access Working Group, IEEE C802.16e-04/446.

* cited by examiner

SYSTEM AND METHOD FOR PROVISIONING SERVICE FLOWS IN BROADBAND WIRELESS ACCESS COMMUNICATION

PRIORITY

This application claims priority to an application entitled "System and Method for Provisioning Service Flows in Broadband Wireless Access Communication" filed in the Korean Intellectual Property Office on Nov. 3, 2004 and assigned Serial No. 2004-89065, the contents of which are incorporated herein by reference.

BACKGROUND OF THE INVENTION

1. Field of the Invention

The present invention relates to a broadband wireless access (BWA) communication system, and more particularly to a system and a method for provisioning service flows which can be provided by a base station (BS).

2. Description of the Related Art

In the $4^{th}$ generation (4G) communication system, which is the next generation communication system, research has been actively pursued to provide users with services having various Qualities of Services (QoSs) at high speed. Especially, in the current 4 G communication system, research has been actively pursued to develop a new type of communication system ensuring mobility and QoS and supporting high speed services in a Broadband Wireless Access (BWA) communication system such as a wireless Local Area Network (LAN) system and a wireless Metropolitan Area Network (MAN) system capable of supporting relatively high transmission speeds. As a representative of such new type communication systems, an Institute of Electrical and Electronics Engineers (IEEE) 802.16e communication system has been developed.

The IEEE 802.16e communication system is a system using an orthogonal frequency division multiplexing (OFDM)/orthogonal frequency division multiple access (OFDMA) scheme for a physical channel of the WMAN system in order to support a broadband transmission network.

Hereinafter, a schematic structure of the conventional IEEE 802.16e communication system will be described with reference to the block diagram of FIG. 1.

The IEEE 802.16e communication system has a multi-cell structure and includes a cell 100, a cell 150, a base station (BS) 110 controlling the cell 100, a base station 140 controlling the cell 150, and a plurality of mobile stations (MSs) 111, 113, 130, 151, and 153. In addition, the BSs 110 and 140 transmit and receive signals to and from the MSs 111, 113, 130, 151, and 153 using the OFDM/OFDMA scheme.

The structure of the conventional IEEE 802.16e communication system is described with reference to FIG. 1, and, hereinafter, an MS initialization operation in the IEEE 802.16e communication system will be described with reference to the flow diagrams of FIGS. 2A and 2B.

When the power of the MS 200 is turned on, the MS performs a cell selection operation (step 211). In other words, the MS 200 monitors all frequency bands preset by the MS 200 so as to detect a reference signal (e.g., a pilot signal) having the strongest intensity, for example, the largest Carrier to Interference and Noise Ratio (CINR). Then, the MS 200 determines a base station (BS) having transmitted the pilot signal having the maximum CINR as a BS 250 currently covering the MS 200, and acquires system synchronization with the BS 250 by receiving a preamble of a downlink frame transmitted from the BS 250. Herein, if system synchronization between the MS 200 and the BS 250 is acquired, the MS 200 receives a DL-MAP message, a UL-MAP message, and an uplink channel descript (UCD) message transmitted from the BS 250. Thus, the MS 200 having received the DL-MAP message, the UL-MAP message, and the UCD message from the BS 250 can recognize time slots used for an initial ranging operation. The MS 200 randomly selects one predetermined time slot from among the time slots used for the initial raging operation and transmits a ranging-request (RNG-REQ) message for the initial ranging operation to the BS 250. Herein, the RNG-REQ message includes an initial ranging connection identifier (CID) and a media access control (MAC) address of the MS 200.

Upon receiving the RNG-REQ message from the MS 200, the BS 250 transmits a ranging-response (RNG-RSP) message, which is a response message for the RNG-REQ message, to the MS 200. If the MS 200 receives the RNG-RSP message from the BS 250, the MS 200 selects the BS 250 as a serving base station of the MS 200 and completes the cell selection operation.

If the cell selection operation is completed, the MS 200 performs entry into a network together with the BS 250. Hereinafter, a detailed description about the entry into the network will be given.

According to the completion of the cell selection operation, the MS 200 receives information about the BS 250 from the BS 250 through the DL-MAP message, the UL-MAP message, a downlink channel descript (DCD) message, a UCD message, and a neighbor advertisement (NBR-ADV) message (step 213). The MS 200 obtains a downlink synchronization with the BS 250 using the BS information received through the DL-MAP message, the UL-MAP message, the DCD message, the UCD message, and the NBR-ADV message (step 215). Thus, the MS 200 having obtained the downlink synchronization with the BS 250 transmits the RNG-REQ message to the BS 250 (step 217).

The BS 250 receives the RNG-REQ message from the MS 200 and allocates a basic connection identifier (basic CID) and a primary management connection identifier (CID) for the MS 200 by mapping with a medium access control (MAC) address included in the received RNG-REQ message (step 219).

The BS 250 allocates the basic CID and the primary management CID for the MS 200 and then transmits a ranging-response (RNG-RSP) message, which is a response message for the RNG-REQ message, to the MS 200 (step 221). Herein, the RNG-RSP message includes the allocated basic CID, the allocated primary management CID, and uplink synchronization information. The MS 200 acquires uplink synchronization with the BS and adjusts frequency of power by receiving the RNG-RSP message (step 223).

The MS 200 transmits a subscriber station basic capability request (SBC-REQ) message to the BS 250 (step 225). Herein, the SBC-REQ message is a medium access control (MAC) message transmitted by the MS 200 in order to negotiate for basic capability with the BS, and the SBC-REQ message includes information about a modulation and coding scheme which can be supported by the MS 200. The BS 250 receives the SBC-REQ message from the MS 200, checks the modulation and coding scheme, which can be supported by the MS 200, included in the SBC-REQ message, and then transmits a subscriber station basic capability response (SBC-RSP) message as a response message for the SBC-REQ message (step 227).

The MS 200 completes the negotiation for its basic capability (step 229) by receiving the SBC-RSP message. Then, the MS 200 transmits a privacy key management request (PKM-REQ) message to the BS 250 (step 231). Herein, the PKM-REQ message is a MAC message used for authentication of the MS and includes certificate information of the MS 200. The BS 250 having received the PKM-REQ message performs authentication with an authentication server (AS) using the certificate information of the MS 200 included in the PKM-REQ message. If it is determined that the MS 200 corresponds to an authenticated MS using the authentication information, the BS 250 transmits a privacy key management response (PKM-RSP) message to the MS 200 as a response message for the PKM-REQ message (step 233). Herein, the PKM-RSP message includes an authentication key (AK) and a traffic encryption key (TEK) allocated to the MS 200.

The MS 200 achieves the authentication of the MS 200 and obtains the traffic encryption key by receiving the PKM-RSP message (step 235). Then, the MS 200 transmits a registration request (REG-REQ) message to the BS 250 (step 237). The REG-REQ message includes MS registration information of the MS 200.

The BS 250 having received the REG-REQ message detects the MS registration information included in the REG-REQ message so as to register the MS 200 in the BS 250 and allocate a secondary management CID for the MS 200. The BS 250 having allocated the secondary management CID transmits a registration response (REG-RSP) message, which is a response message for the REG-REQ message, to the MS 200 (step 239). Herein, the REG-RSP message includes the allocated secondary management CID and the MS registration information.

The MS 200 completes its registration and obtains the secondary management CID by receiving the REG-RSP message (step 241). Thus, if the MS registration is completed, the MS 200 is allocated with three CIDs (i.e., the initial basic CID, the primary management CID, and the secondary management CID). Thus, if the MS 200 is completely registered, the BS 250 performs provisioning for service flows provided by the BS (step 260). A detailed description about the provisioning for the service flows is later given.

If the provisioning for the service flows is completed, that is, if an initialization operation of the MS 200 is completed, the MS 200 transits into a normal operation mode, an Internet protocol (IP) connection between the MS 200 and the BS 250 is achieved, and administration information is downloaded through the IP connection (step 271). Thereafter, the service flow is made between the MS 200 and the BS 250 (step 273). Herein, the service flow denotes a flow in which a MAC-service data unit (SDU) is transmitted and received through a connection having a predetermined QoS type. Since a transport CID must be allocated to the MS 200 when the MAC-SDU (i.e. traffic) is transmitted and received as described above, the MS is allocated with the transport CID in the connection of the service flow. Thus, if the connection of the service flow is achieved, a service is actually performed between the MS 200 and the BS 250 (step 275).

Hereinafter, detailed description about the provisioning for the service flow will be given.

If the registration of the MS 200 is completed, the BS 250 transmits a dynamic service addition request (DSA-REQ) message to the MS 200 (step 261). As the MS 200 receives the DSA-REQ message from the BS 250, the MS 200 transmits a dynamic service addition response (DSA-RSP) message, which is a response message for the DSA-REQ message (step 263). Herein, an operation of transmitting and receiving the DSA-REQ message or the DSA-RSP message is called a "DSA message transaction operation". One DSA message transaction operation allows the setting of only one QoS type for a service flow. Accordingly, if there exists a plurality of QoS types supported by the BS 250, DSA message transaction operations corresponding to the number of the QoS types supported by the BS 250 must be performed with respect to the downlink or the uplink.

For example, the IEEE 802.16e communication system supports all four QoS types including an unsolicited granted service (UGS) type, a real time polling service type (rtPS) type, a non real time polling service (nrtPS) type, and a best effort (BE) type.

Therefore, if the BS 250 can support all four QoS types, the BS 250 performs service flow provisioning for the four QoS types through the DSA message transaction operations in the uplink or the downlink. In other words, the BS 250 performs four DSA message transaction operations in order to perform service flow provisioning for the four QoS types in the downlink. In addition, the BS 250 performs four DSA message transaction operations in order to perform service flow provisioning for the four QoS types in the uplink. As a result, the BS 250 performs the DSA message transaction operation eight times.

However, it is impossible for the IEEE 802.16e communication system to provide information about the number of service flows to be provisioned by the BS or information about a time point for the final provisioning of the BS. Accordingly, it is impossible for the MS to recognize the time point at which the final service flow provisioning of the BS is terminated, so that it is impossible for the MS to exactly detect the time point at which the MS transits into the normal operation mode. Thus, since the MS cannot accurately recognize the time point at which the MS enters into the normal operation mode, service quality provided by the MS is degraded.

SUMMARY OF THE INVENTION

Accordingly, the present invention has been made to solve the above-mentioned problems occurring in the prior art, and an object of the present invention is to provide a system and a method for provisioning a service flow in a broadband wireless access communication system.

Another object of the present invention is to provide a system and method for reporting the number of service flows to be provisioned by a base station in a broadband wireless access communication system.

Still another object of the present invention is to provide a system and a method for reporting information about a time point for the last service flow provisioning of a base station in a broadband wireless access communication system.

To accomplish the above objects, there is provided a system for provisioning service flows in a broadband wireless access communication system, the system including a mobile station for transmitting a registration request message to a base station, and the base station for including information about service flows to be provisioned by the base station into a registration response message and transmitting the registration response message to the mobile station if the registration request message is received.

According to another aspect of the present invention, there is provided a system for provisioning service flows in a broadband wireless access communication system, the system including a base station for transmitting a dynamic service addition request message including information about service flows to be provisioned by the base station to a mobile station, and a mobile station for transmitting a dynamic service addition response message to the base station if the dynamic service addition request message is received.

According to still another aspect of the present invention, there is provided a method for provisioning service flows in a broadband wireless access communication system, the method including the steps of receiving a registration request message from a mobile station, and inserting information about service flows to be provisioned by a base station into a registration response message and transmitting the registration response message to the mobile station after the registration request message is received.

According to still yet another aspect of the present invention, there is provided a method for provisioning service flows in a broadband wireless access communication system, the method including the steps of transmitting a dynamic service addition request message including information about service flows to be provisioned by a base station to a mobile station, and receiving a dynamic service addition response message from the mobile station after the dynamic service addition request message is transmitted.

According to still another aspect of the present invention, there is provided a method for provisioning service flows in a broadband wireless access communication system, the method including the steps of transmitting a registration request message to a base station, and receiving a registration response message including information about service flows to be provisioned by the base station from the base station after the registration request message is transmitted.

According to yet another aspect of the present invention, there is provided a method for provisioning service flows in a broadband wireless access communication system, the method including the steps of receiving a dynamic service addition request message including information about service flows to be provisioned by a base station from the base station, transmitting a dynamic service addition response message to the base station after the dynamic service addition request message is received, and determining whether to transit into a normal operation mode corresponding to the information.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
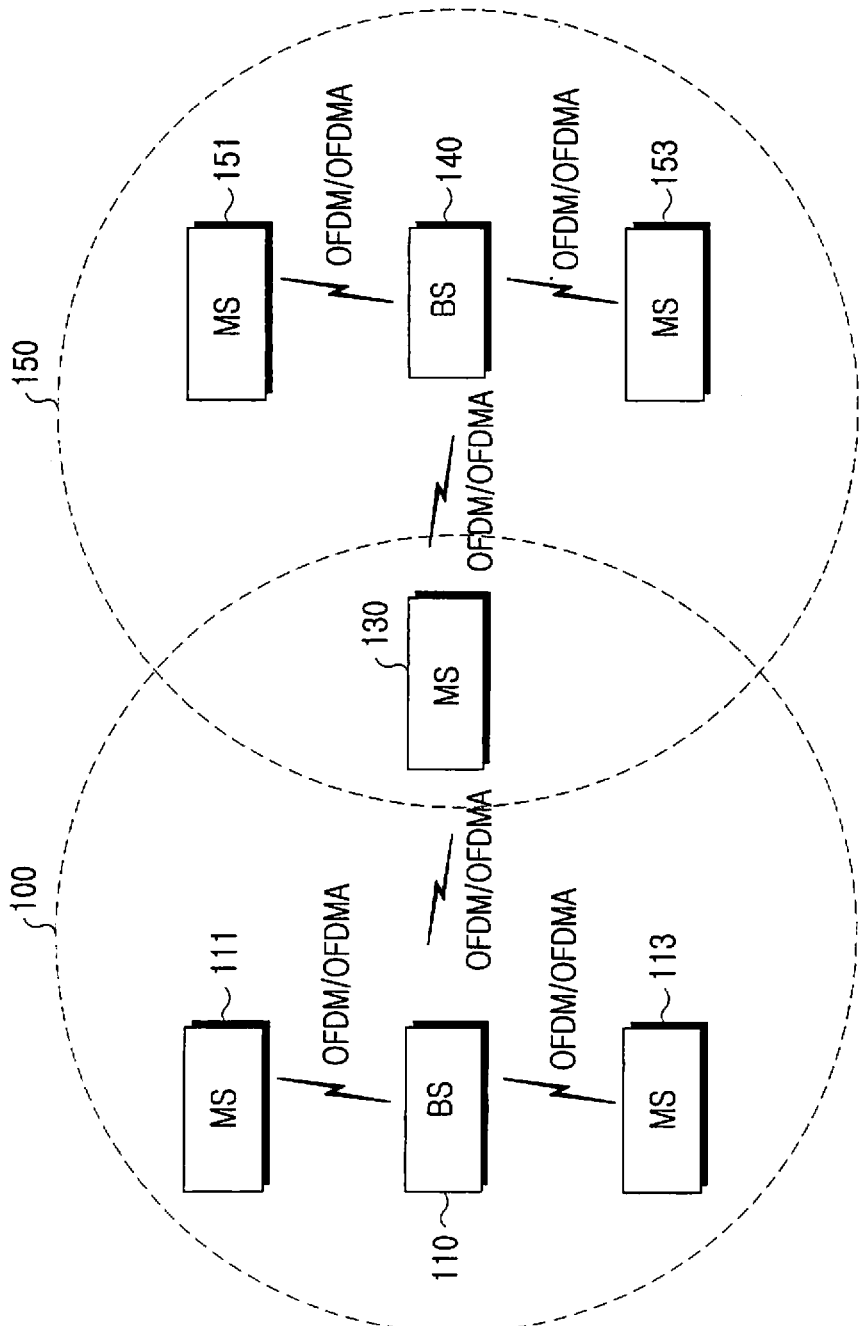
FIG. 1 is a block diagram illustrating a schematic structure of a typical IEEE 802.16e communication system.

Hereinafter, preferred embodiments of the present invention will be described in detail with reference to the accompanying drawings. Note that the same or similar components in drawings are designated by the same reference numerals as far as possible although they are shown in different drawings. In the following description of the present invention, a detailed description of known functions and configurations incorporated herein will be omitted when it may make the subject matter of the present invention unclear.

The present invention proposes a system and a method for provisioning a service flow in an Institute of Electrical and Electronics Engineers (IEEE) 802.16e communication system, which is a broadband wireless access (BWA) communication system. In particular, the present invention proposes a system and a method allowing a mobile station (MS) to exactly detect the time point for the transition into a normal operation mode in an initialization operation by reporting the number of service flows to be provisioned by a base station (BS) to the MS in advance or the reporting information about a time point for the last service flow provisioning of the BS to the MS in advance in the IEEE 802.16e communication system.

Figure 2A:
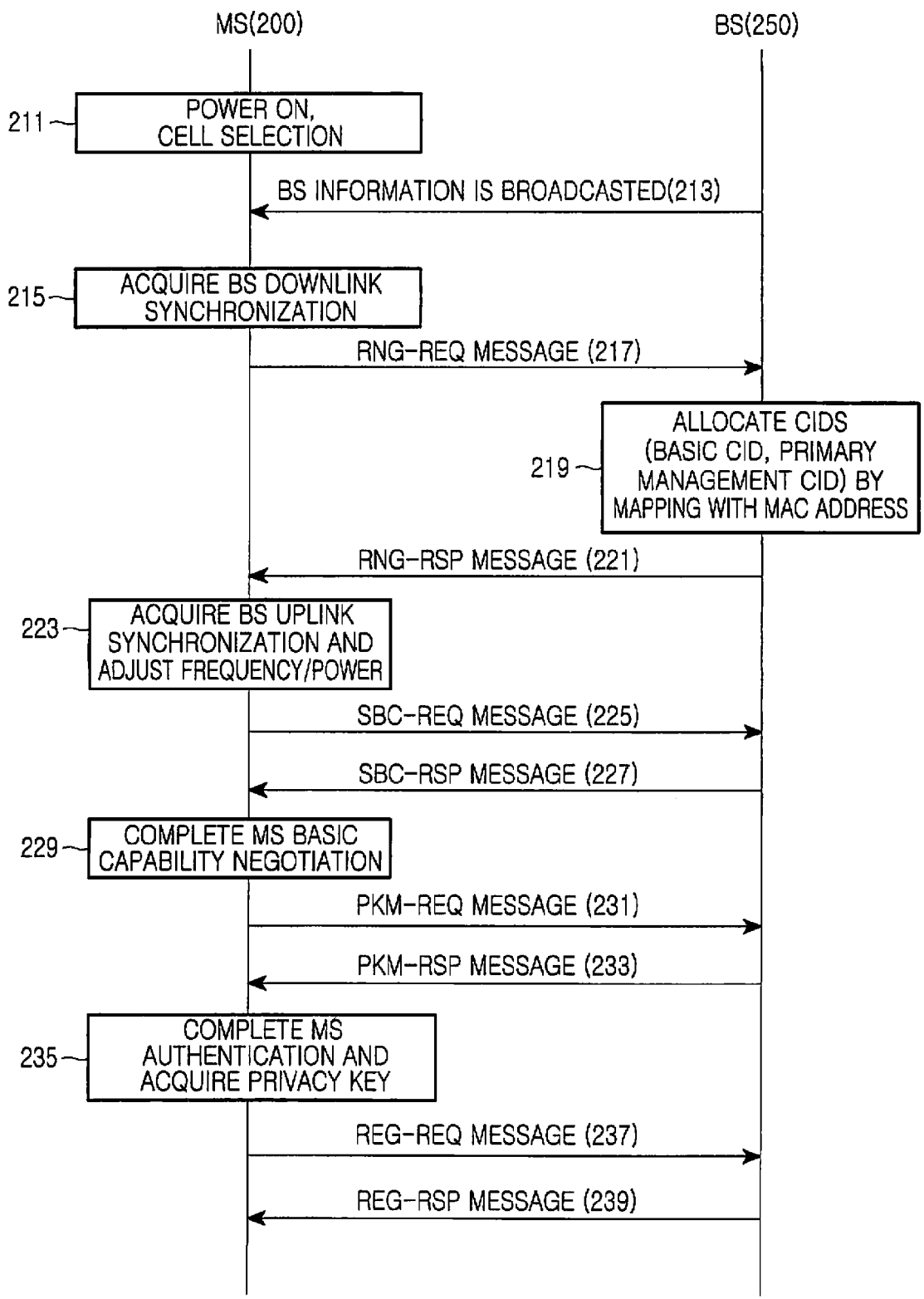
FIGS. 2A and 2B are signal flowcharts illustrating a procedure for an initialization operation of an MS in the conventional IEEE 802.16e communication system.
Figure 2B:
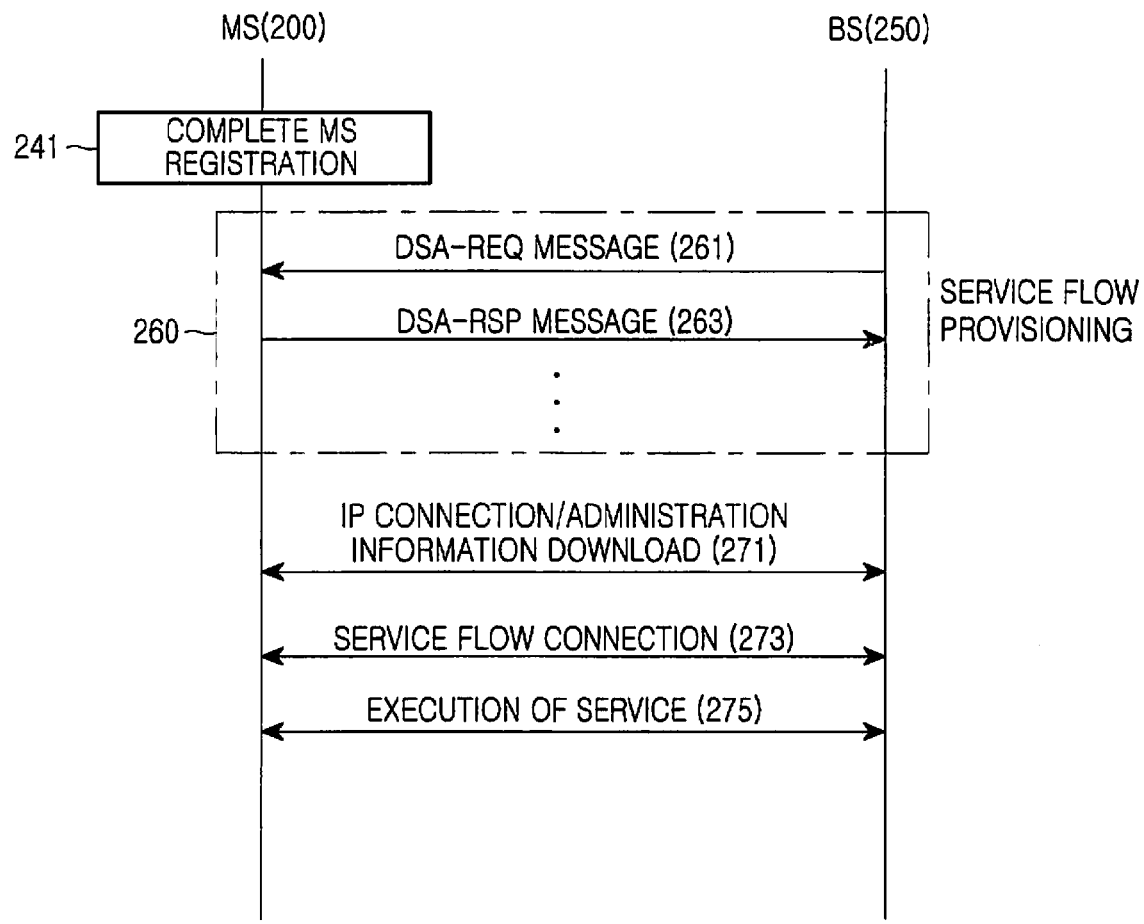

Prior to describing the present invention, it should be noted that the conventional MS initialization operation shown in FIG. 2 (steps 211 to 235) is identically applied to an MS initialization operation according to the present invention. Accordingly, the MS initial operation of the present invention corresponding to the conventional MS initial operation will be omitted in order to avoid redundancy. In addition, although the IEEE 802.16e communication system is described as one example according to the present invention, it is understood that the present invention is applicable to other communication systems supporting the service flow provisioning operation, in addition to the IEEE 802.16e communication system.

Figure 3:
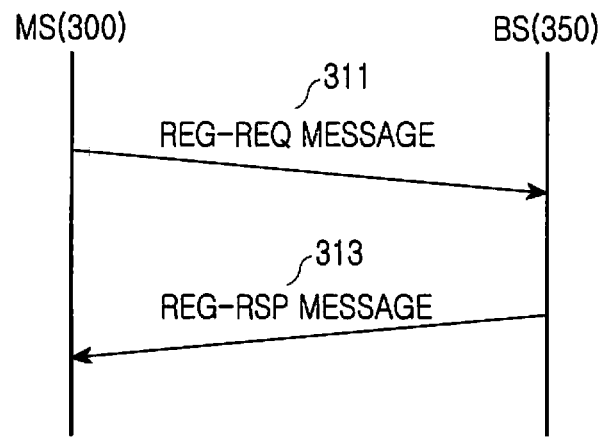
FIG. 3 is a signal flowchart schematically illustrating the procedure for a service flow provisioning operation of the IEEE 802.16e communication system according to a first embodiment of the present invention.

FIG. 3 is a signal flowchart schematically illustrating a service flow provisioning operation of the IEEE 802.16e communication system according to a first embodiment of the present invention.

Prior to the description of FIG. 3, according to the first embodiment of the present invention, the number of service flows to be provisioned by a BS is reported to an MS through a registration response (REG-RSP) message, thereby allowing the MS to exactly recognize a time point for the service flow provisioning termination so as to exactly recognize a time point for transition into a normal operation mode. In other words, according to the first embodiment of the present invention, the number of service flows to be provisioned by the BS is expressed as the number of dynamic service addition (DSA) message transaction operations, so that the number of service flows can be reported through the REG-RSP message.

The DSA message transaction operation denotes an operation of transmitting and receiving a dynamic service addition request (DSA-REQ) message or a dynamic service addition response (DSA-RSP) message, which is a response message for the DSA-REQ message. In addition, one DSA message transaction operation can set only one Quality of Service (QoS) type for a service flow. Accordingly, when there exist a plurality of QoS types supported by the BS, DSA message transaction operations corresponding to the number of the QoS types supported by the BS must be performed with respect to a downlink or an uplink.

Referring to FIG. 3, while performing the initialization operation, an MS 300 receives a privacy key management response (PKM-RSP) message so as to achieve its authentication. If the MS 300 obtains the privacy key, the MS 300 transmits a registration request (REG-REQ) message to a BS 350 (step 311). The REG-REQ message includes a provisioning service flow field and MS registration information, and the provisioning service flow field represents that the MS 300 requests information about the number of service flows to be provisioned by the BS 350 to the BS 350.

The BS 350 having received the REG-REQ message from the MS 300 transmits the REG-RSP message, which is a response message for the REG-RSP message, to the MS 300 by inserting the number of DSA message transaction operations according to the number of service flows to be provisioned by the BS 350 into the provisioning service flow field of the REG-RSP message (step 313). Although the number of DSA message transaction operations according to the number of service flows to be provisioned is recorded in the provisioning service flow field of the REG-RSP message so that the number of the service flows to be provisioned by the BS 350 can be recognized according to an embodiment of the present invention, the number of the service flows may also be recorded instead of the number of DSA message transaction operations.

The IEEE 802.16e communication system supports all four QoS types including an unsolicited granted service (UGS) type, a real time polling service type (rtPS) type, a non real time polling service (nrtPS) type, and a best effort (BE) type. For example, if the BS 350 can support only three of four QoS types, information representing that six DSA message transaction operations in the uplink and the downlink are performed is recorded in the provisioning service flow field of the REG-REQ message.

If the MS 300 receives the REG-RSP message from the BS 350, the MS 300 detects the number of the DSA message transaction operations recorded in the provisioning service flow field of the REG-REQ message so that the MS 300 can exactly recognize a time point of the service flow provisioning termination. Although the number of the service flows to be provisioned by the BS 350 is reported through the operation of transmitting and receiving the REG-REQ message and the REG-RSP message in FIG. 3, the number of the service flows to be provisioned by the BS 350 may also be reported to the MS 300 through an operation of transmitting and receiving other messages when the initialization operation is performed. For example, the number of the service flows to be provisioned by the BS 350 may be reported to the MS 300 through an operation of transmitting and receiving a subscriber station basic capability request (SBC-REQ) message and a subscriber station basic capability response (SBC-RSP) message.

The service flow provisioning operation of the IEEE 802.16e communication system according to the first embodiment of the present invention has been described with reference to FIG. 3. Hereinafter, description about the service flow provisioning operation of the IEEE 802.16e communication system according to the second embodiment of the present invention will be given with reference to the signal flowchart of FIG. 4.

Figure 4:
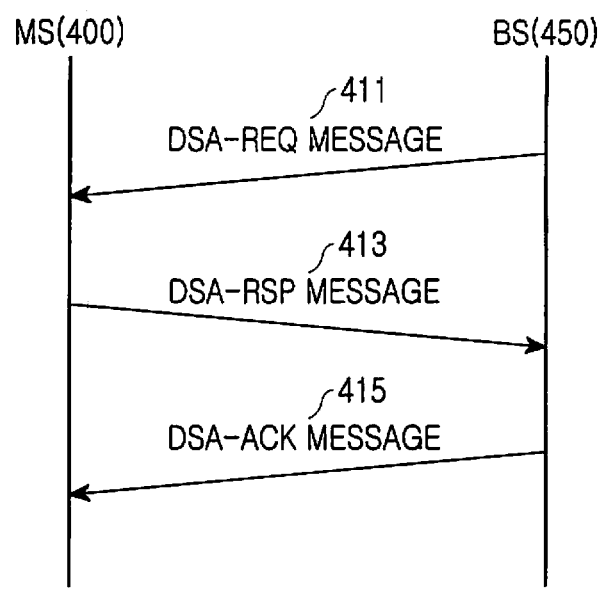
FIG. 4 is a signal flowchart schematically illustrating the procedure for a service flow provisioning operation of the IEEE 802.16e communication system according to a second embodiment of the present invention.

Prior to the description of FIG. 4, according to the second embodiment of the present invention, a BS reports to an MS a service flow provisioning state instead of the number of service flows to be provisioned by the BS through the DSA-REQ message, so that the MS can exactly recognize a time point for the service flow provisioning termination so as to exactly recognize a time point for transition into a normal operation mode. In other words, according to the second embodiment of the present invention, the service flow provisioning state is classified into a "continue state" and a "done state" and reported to the MS through the DSA-REQ message. Herein, the "continue state" represents that the BS is provisioning a service flow (that is, a DSA message transaction operation is additionally performed thereafter), and the "done state" represents that the BS terminates service flow provisioning (that is, the DSA message transaction operation is not performed thereafter).

Referring to FIG. 4, if the registration of an MS 400 is completed in an initialization operation of the MS 400, a BS 450 transmits the DSA-REQ message to the MS 400 (step 411). The DSA-REQ message includes a provisioning service flow state field, and the provisioning service flow state field may be realized by one bit. In this case, provisioning service flow state field values of '0' and '1' represent the "continue state" and the "done state", respectively.

The MS 400 having received the DSA-REQ message from the BS 450 detects the provisioning service flow state field value included in the DSA-REQ message so as to detect the state of the service flow provisioning of the BS 450. In other words, if the provisioning service flow state field value included in the DSA-REQ is '0', the MS 400 recognizes that the MS 400 must continuously perform the DSA message transaction operation thereafter. If the provisioning service flow state field value included in the DSA-REQ is '1', the MS 400 transits into the normal operation mode because it is unnecessary to perform the DSA message transaction operation.

Then, the MS 400 transmits the DSA-RSP message, which is a response message for the DSA-REQ message, to the BS 450 (step 413). As the BS 450 receives the DSA-RSP message from the MS 450, the BS 450 transmits a dynamic service addition acknowledge (DSA-ACK) message representing that the DSA-RSP message is normally received (step 415).

Although the BS newly inserts the provisioning service flow field into the DSA-REQ message in order to report the service flow provisioning state thereof according to the present invention, the BS may report the service flow provisioning state thereof by modifying one of fields having been already included in the DSA-REQ message. For example, the BS may report the service flow provisioning state of the BS by modifying the third bit among reserved bits in a QoS parameter set type field of the DSA-REQ message such that the third bit represents the service flow provisioning state. In addition, it is natural that the BS use the QoS parameter set type field by modifying a certain bit among the reserved bits in the QoS parameter set type field of the DSA-REQ message instead of the third bit to the service flow provisioning state field.

Hereinafter, the QoS parameter set type field format in a case in which the QoS parameter set type field of the DSA-REQ message is modified to the service flow provisioning state field will be described with reference to Tables 1 and 2.

TABLE 1

| Type | Length | Value | Length |
|------|--------|-------|--------|
| [145/146].5 | 1 | Bit 0: Provisioned Set<br>Bit 1: Admitted Set<br>Bit 2: Active Set<br>Bit 3: Last Provisioning Set<br>Bit 4~7: Reserved | DSx-REQ<br>DSx-RSP<br>DSx-ACK |

If the third bit among the reserved bits in the QoS parameter set type field is recorded as "Last Provisioning Set" representing that the service flow provisioning state of the BS is the last service flow provisioning state as shown in Table 1, the third bit represents that a DSA message transaction operation is not performed thereafter. In other words, if the third bit among the reserved bits in the QoS parameter set type field is recorded as "Last Provisioning Set", a current DSA message transaction operation is the last DSA message transaction operation.

TABLE 2

| Type | Length | Value | Length |
|---|---|---|---|
| [145/146].5 | 1 | Bit 0: Provisioned Set<br>Bit 1: Admitted Set<br>Bit 2: Active Set<br>Bit 3: Contined Provisioning Set<br>Bit 4~7: Reserved | DSx-REQ<br>DSx-RSP<br>DSx-ACK |

If the third bit among the reserved bits in the QoS parameter set type field is recorded as "Continued Provisioning Set" representing that the service flow provisioning of the BS is additionally performed as shown in Table 2, the third bit represents that a DSA message transaction operation is performed thereafter. In other words, if the third bit among the reserved bits in the QoS parameter set type field is recorded as "Continued Provisioning Set", a DSA message transaction operation is additionally performed after a current DSA message transaction operation.

As described above, according to the present invention, a BS reports the number of service flows to be provisioned to a MS, thereby enabling the MS to exactly recognize a service flow provisioning completion time point of the BS so as to transit into a normal operation mode in a broadband wireless access communication system. Accordingly, it is possible to minimize a delay due to the service flow provisioning in the initialization operation of the MS, thereby improving a service quality.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed:

1. A method for provisioning service flows in a broadband wireless access communication system, the method comprising:
   receiving a first message from a mobile station; and
   transmitting a second message including information about service flows to be provisioned by a base station to the mobile station after receiving the first message,
   wherein the information includes a total number of the service flows to be provisioned by the base station.

2. The method of claim 1, wherein the first message is one of a registration request (REG-REQ) message and a subscriber station basic capability request (SBC-REQ) message, the second message is a registration response (REG-RSP) message when the first message is the REG-REQ message, and the second message is a subscriber station basic capability response (SBC-RSP) message when the first message is the SBC-REQ message.

3. The method of claim 1, further comprising:
   transmitting a Dynamic Service Addition request (DSA-REQ) message to the mobile station; and
   receiving a Dynamic Service Addition response (DSA-RSP) message from the mobile station according to the total number of the service flows to be provisioned by the base station.

4. The method of claim 1, wherein transmitting the second message comprises:
   inserting the information about service flows to be provisioned by the base station into the second message; and
   transmitting the second message to the mobile station.

5. The method of claim 1, further comprising:
   receiving a ranging request (RNG-REQ) message from the mobile station including a medium access control (MAC) address of the mobile station; and
   transmitting a ranging response (RNG-RSP) message including a basic connection identifier (CID) and a primary management CID for the mobile station to the mobile station.

6. A method for provisioning service flows in a broadband wireless access communication system, the method comprising:
   transmitting a first message to a base station; and
   receiving a second message including information about service flows to be provisioned by the base station from the base station after transmitting the first message,
   wherein the information includes a total number of the service flows to be provisioned by the base station.

7. The method of claim 6, wherein the first message is one of a registration request (REG-REQ) message and a subscriber station basic capability request (SBC-REQ) message, the second message is a registration response (REG-RSP) message when the first message is the REG-REQ message, and the second message is a subscriber station basic capability response (SBC-RSP) message when the first message is the SBC-REQ message.

8. The method of claim 6, further comprising:
   receiving a Dynamic Service Addition request (DSA-REQ) message from the base station; and
   transmitting a Dynamic Service Addition response (DSA-RSP) message to the base station according to the total number of the service flows to be provisioned by the base station.

9. The method of claim 6, further comprising:
   transmitting a ranging request (RNG-REQ) message to the base station including a medium access control (MAC) address of the mobile station; and
   receiving a ranging response (RNG-RSP) message including a basic connection identifier (CID) and a primary management CID for the mobile station from the base station.

10. An apparatus of a base station for provisioning service flows in a broadband wireless access communication system, the apparatus comprising:
    a receiver configured to receive a first message from a mobile station; and
    a transmitter configured to transmit a second message including information about service flows to be provisioned by the base station to the mobile station after receiving the first message,
    wherein the information includes a total number of the service flows to be provisioned by the base station.

11. The apparatus of claim 10, wherein the first message is one of a registration request (REG-REQ) message and a subscriber station basic capability request (SBC-REQ) message, the second message is a registration response (REG-RSP) message when the first message is the REG-REQ message, and the second message is a subscriber station basic capability response (SBC-RSP) message when the first message is the SBC-REQ message.

12. The apparatus of claim 11, wherein the transmitter is configured to transmit a Dynamic Service Addition request (DSA-REQ) message to the mobile station, and
    the receiver is configured to receive a Dynamic Service Addition response (DSA-RSP) message from the mobile station according to the total number of the service flows to be provisioned by the base station.

13. The apparatus of claim 10, wherein the receiver is configured to receive a ranging request (RNG-REQ) message from the mobile station including a medium access control (MAC) address of the mobile station, and the transmitter is configured to transmit a ranging response (RNG-RSP) message including a basic connection identifier (CID) and a primary management CID for the mobile station to the mobile station.

14. An apparatus of mobile station for provisioning service flows in a broadband wireless access communication system, the apparatus comprising:

a transmitter configured to transmit a first message to a base station, and a receiver configured to receive a second message including information about service flows to be provisioned by the base station from the base station after transmitting the first message, wherein the information includes a total number of the service flows to be provisioned by the base station.

15. The apparatus of claim 14, wherein the first message is one of a registration request (REG-REQ) message and a subscriber station basic capability request (SBC-REQ) message, the second message is a registration response (REG-RSP) message when the first message is the REG-REQ message, and the second message is a subscriber station basic capability response (SBC-RSP) message when the first message is the SBC-REQ message.

16. The apparatus of claim 14, wherein the receiver is configured to receive a Dynamic Service Addition request (DSA-REQ) message from the base station, and the transmitter is configured to transmit a Dynamic Service Addition response (DSA-RSP) message to the base station according to the total number of the service flows to be provisioned by the base station.

17. The apparatus of claim 14, wherein the transmitter transmits a ranging request (RNG-REQ) message to the base station including a medium access control (MAC) address of the mobile station, and the receiver receives a ranging response (RNG-RSP) message including a basic connection identifier (CID) and a primary management CID for the mobile station from the base station.

18. A method for provisioning service flows in a broadband wireless access communication system, the method comprising:

receiving a registration request (REG-REQ) message from a mobile station; and transmitting a registration response (REG-RSP) message including information about service flows to be provisioned by a base station to the mobile station after receiving the registration request message, wherein the information includes a total number of Dynamic Service Addition (DSA) transactions with the service flows.

19. The method as claimed in claim 18, wherein each of the DSA transactions includes an operation of transmitting a Dynamic Service Addition request (DSA-REQ) message by the base station and an operation of transmitting a Dynamic Service Addition response (DSA-RSP) message by the mobile station.

20. An apparatus for provisioning service flows in a broadband wireless access communication system, the apparatus comprising:

a receiver configured to receive a registration request (REG-REQ) message from a mobile station; and a transmitter configured to transmit a registration response (REG-RSP) message including information about service flows to be provisioned by the base station to the mobile station after receiving the registration request message, wherein the information includes a total number of Dynamic Service Addition (DSA) transactions with the service flows.

21. The apparatus as claimed in claim 20, wherein each of the DSA transactions includes an operation of transmitting a Dynamic Service Addition request (DSA-REQ) message by the base station and an operation of transmitting a Dynamic Service Addition response (DSA-RSP) message by the mobile station.

22. A method for provisioning service flows in a broadband wireless access communication system, the method comprising:

transmitting a registration request (REG-REQ) message to a base station; and receiving a registration response (REG-RSP) message including information about service flows to be provisioned by the base station after transmitting the registration request message, wherein the information includes a total number of Dynamic Service Addition (DSA) transactions with the service flows.

23. The method as claimed in claim 22, wherein each of the DSA transactions includes an operation of receiving a Dynamic Service Addition request (DSA-REQ) message from the base station and an operation of transmitting a Dynamic Service Addition response (DSA-RSP) message to the base station.

24. An apparatus of a mobile station for provisioning service flows in a broadband wireless access communication system, the apparatus comprising:

a transmitter configured to transmit a registration request (REG-REQ) message to a base station; and a receiver configured to receive a registration response (REG-RSP) message including information about service flows to be provisioned by the base station after transmitting the registration request message, wherein the information includes a total number of Dynamic Service Addition (DSA) transactions with the service flows.

25. The apparatus as claimed in claim 24, wherein each of the DSA transactions includes an operation of transmitting a Dynamic Service Addition request (DSA-REQ) message by the base station and an operation of transmitting a Dynamic Service Addition response (DSA-RSP) message by the mobile station.

* * * * *